United States Patent [19]

Davy

[11] Patent Number: 4,473,845
[45] Date of Patent: Sep. 25, 1984

[54] METHOD AND APPARATUS FOR PROCESSING SIGNALS FROM A SOLID-STATE IMAGE SENSOR

[75] Inventor: Lee N. Davy, Rochester, N.Y.

[73] Assignee: Eastman Kodak Company, Rochester, N.Y.

[21] Appl. No.: 460,524

[22] Filed: Jan. 24, 1983

[51] Int. Cl.³ .......................... H04N 5/14; H04N 3/14
[52] U.S. Cl. ..................................... 358/163; 358/166; 358/213
[58] Field of Search .............. 358/163, 213, 166, 167, 358/162; 382/54

[56] References Cited

U.S. PATENT DOCUMENTS

| | | |
|---|---|---|
| 3,814,847 | 6/1974 | Longuet ............................... 358/162 |
| 4,065,788 | 12/1977 | Meier et al. ......................... 358/166 |
| 4,167,754 | 9/1979 | Nagumo et al. ..................... 358/167 |
| 4,176,373 | 11/1979 | Dillon et al. .......................... 358/37 |
| 4,189,751 | 2/1980 | Nagumo .............................. 358/213 |
| 4,317,134 | 3/1982 | Woo et al. ........................... 358/213 |
| 4,377,820 | 3/1983 | Reitmeier ............................ 358/163 |
| 4,392,157 | 7/1983 | Garcia et al. ....................... 358/167 |
| 4,400,734 | 8/1983 | Davy ................................... 358/213 |

Primary Examiner—John C. Martin
Assistant Examiner—Michael D. Parker
Attorney, Agent, or Firm—Thomas H. Close

[57] ABSTRACT

Output signals from a solid state image sensor having defect locations causing corresponding defects in the output signals are processed by correcting the defective portions of the signals; and image enhancing only those portions of the signal not in the neighborhood of a corrected defect.

15 Claims, 2 Drawing Figures

METHOD AND APPARATUS FOR PROCESSING SIGNALS FROM A SOLID-STATE IMAGE SENSOR

BACKGROUND OF THE INVENTION

1. Field of the Invention

The present invention relates to signal processing apparatus for processing the output signals from a solid state image sensor, for example, a charge coupled device (CCD) image sensor, and more particularly to a signal processing circuit for performing defect correction and image enhancement on such output signals.

2. Discussion Related to the Problem

The use of solid state image sensors in television cameras, electronic still cameras, and film scanners for producing TV signals from pictures on film is well known. It is also know to be desirable to image enhance the output signals produced by such image sensors. Well known techniques for image enhancement include crispening, sometimes called unsharp masking, to accentuate the appearance of fine detail; and noise reduction, for example "coring" used to suppress the appearance of film grain in film scanners. In the manufacture of solid state image sensors, such as CCD image sensors, many devices are produced having relatively few defects, but relatively few devices are produced having no defects. It is well known that if a relatively few defects in such devices can be accepted, the manufacturing yield of useful devices increases dramatically. It has been found however, that when the output signal of a device having a few tolerable defects is subjected to image enhancement, such as crispening, the appearance of the defect becomes enhanced, rendering the appearance of the defect intolerable.

Several approaches have been suggested for correcting defects in the output signals of image sensors. In one such approach, the output signal of the image sensor is sampled by a sample-and-hold circuit. When a defect is present in the output signal, the sample-and-hold circuit is not clocked, thereby replacing the defective portion of the signal with an adjacent undefective portion. For an example of this type of defect correction, see U.S. Pat. No. 4,167,754 issued Sept. 11, 1979 to Nagumo et al. It is also known to correct defects in the output signals of image sensors by interpolating between adjacent non-defective portions of the signal to compute a replacement value for the defective portion.

It would appear to be desirable to implement defect correction prior to image enhancement of the output signal of a solid state image sensor to avoid enhancement of the defects in the signal. Unexpectedly, however, it has been found that under some circumstances, for example in the scanning of color negative film to produce a TV signal, the appearance of the image-enhanced, defect-corrected signal is even more objectionable than the appearance of an enhanced signal to which no defect correction has been applied.

The challenge faced by the inventor therefore, was to provide a signal processing method and apparatus for defect correction and image enhancement that avoided the problems noted above.

SOLUTION TO THE PROBLEM—SUMMARY OF THE INVENTION

According to my invention, output signals from a solid state image sensor having defect locations causing corresponding defects in the output signals thereof, are processed by correcting the defective portions of the signal, and image enhancing only those portions of the signal not in the neighborhood of a corrected defect.

As used herein, the neighborhood of a signal portion refers to those other portions of a signal which would be employed according to a particular procedure to image-enhance the signal portion. The neighbors of a signal portion are those other signal portions in its neighborhood.

In one embodiment of the invention, the output signal is supplied to a finite impulse response (FIR) filter that produces a defect corrected signal, an image enhanced signal, and an appropriately delayed unenhanced output signal that matches the time base of the other signals. A programmed memory, containing information regarding which of the output signals from the FIR filter to select at any given time, is addressed in synchronism with the readout of the device. The information from the memory controls an array of switches that select the proper signal from the finite impulse response filter.

In an alternative embodiment of the invention, the output signal is sampled by a sample-and-hold circuit. Defects are corrected by inhibiting the sampling of the sample-and-hold circuit for the portion of the signal containing the defect, thereby replacing the defective portion with an adjacent non-defective portion of the signal. The image is enhanced by forming a "blurred" signal comprising a running average of the signal in a two dimensional neighborhood surrounding the portion of the signal being processed. The "blurred" signal is subtracted from an appropriately delayed version of the output signal to yield a detail signal. The detail signal is "cored" to remove high frequency, low amplitude information therefrom. The "cored" detail signal is boosted and added back to the "blurred" signal to form the image enhanced signal. In the neighborhood of a defect, the addition of the "cored" detail signal is inhibited, and only the "blurred" signal is output.

BRIEF DESCRIPTION OF THE DRAWINGS

The invention will be described with reference to the drawings, wherein.

DETAILED DESCRIPTION OF THE PREFERRED EMBODIMENTS

Figure 1:
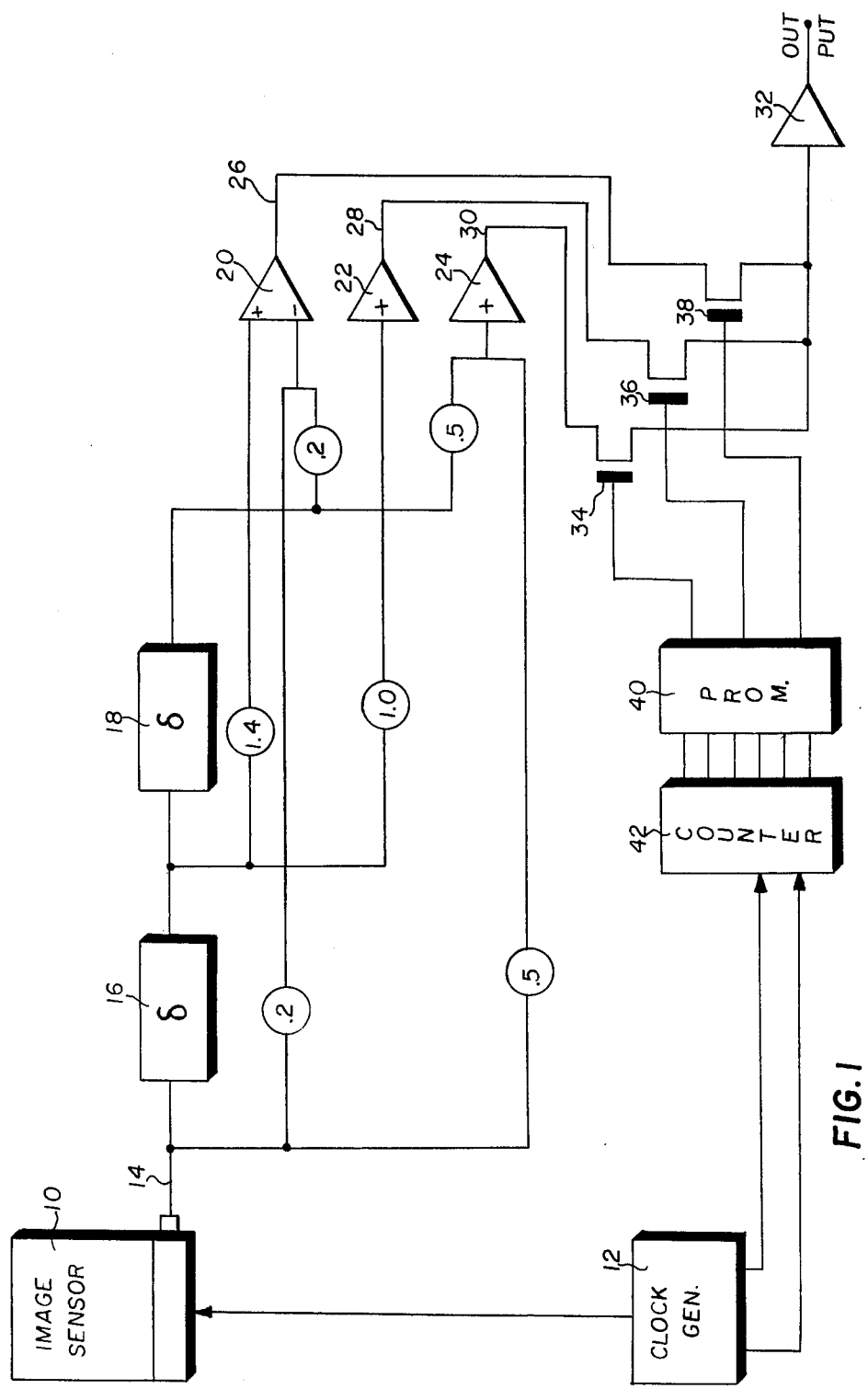
FIG. 1 is a schematic diagram of an exemplary embodiment of signal processing apparatus according to the present invention.

Referring now to FIG. 1, an exemplary signal processing circuit for implementing the signal processing method according to the present invention is shown. A solid state image sensor 10, such as a frame transfer or interline transfer type CCD image sensor subject to column defects, is supplied with clocking signals from a clock generator 12 to produce an output signal on line 14. A finite impulse response (FIR) filter comprising a pair of one-picture element (pixel) delays 16 and 18, and three amplifiers 20, 22, and 24, receives the output signal and produces three output signals on lines 26, 28 and 30. An image enhanced signal is produced on line 26, by amplifier 20, by subtracting a weighted sum of the undelayed, and two pixel delayed versions of the output signal from an amplified version of the one pixel delayed output signal. This arrangement represents one example of a family of well-known "crispening" filters employed to enhance the appearance of fine detail. For the sake of simplicity, a one-dimensional filter is shown which accentuates detail only in components of vertical detail.

The unprocessed output signal is produced on line 28, delayed by one pixel to match the time base of the other output signals.

A defect-corrected signal is produced by amplifier 24 by taking a weighted sum of the undelayed and the two-pixeled delayed signals, to produce an interpolated pixel value on line 30.

The weighting coefficients used for the undelayed, one pixel delayed, and two pixel delayed signals to produce the image enhanced, defect-corrected, and unenhanced signals are shown in Table 1 below.

TABLE 1

| Weighting Coefficients | | | |
| --- | --- | --- | --- |
| Undelayed | 1 Pixel Delayed | 2 Pixel Delayed | Output Signal |
| −.2 | 1.4 | −.2 | image-enhanced |
| .5 | 0 | .5 | defect-corrected |
| 0 | 1.0 | 0 | unenhanced |

The three signals on lines 26, 28, and 30 are supplied to an output amplifier 32 through FET switches 34, 36, and 38 respectively. The respective gates of the FET switches are controlled to open or close the switches by a programable memory 40, programmed to contain information regarding the desired state of the gates of the FET transistor switches for each pixel in a line of output. The programable memory 40 is addressed by a counter 42 that is clocked in synchronism with the clocking of the image sensor. The counter is recycled for each line of output from the image sensor. Memory 40 contains as many storage locations as there are vertical columns in the image sensor 10, e.g. approximately 500. The method of programming the memory based on the detection of defective locations in the image sensor will be apparent to one skilled in the art. Two bits per column are sufficient for encoding the required information regarding the state of FET switches 34, 36, and 38.

The operation of the signal processing device will now be described. Suppose for example that the tenth column of the image sensor is defective. The memory 40 contains in locations 1-8, the information to close switch 38 while switches 34 and 36 remain open, thereby supplying the image-enhanced signal to the output amplifier 32. Locations 9 and 11 contain information to close switch 36 while switches 34 and 38 remain open, thereby preventing image enhancement in the neighborhood of a defect. Location 10 contains information to close switch 34, leaving open switches 36 and 38, thereby providing the unenhanced defect-corrected signal to amplifier 32. Pictures processed according to the method of the present invention show enhancement of the image while suppressing the appearance of defects.

Figure 2:
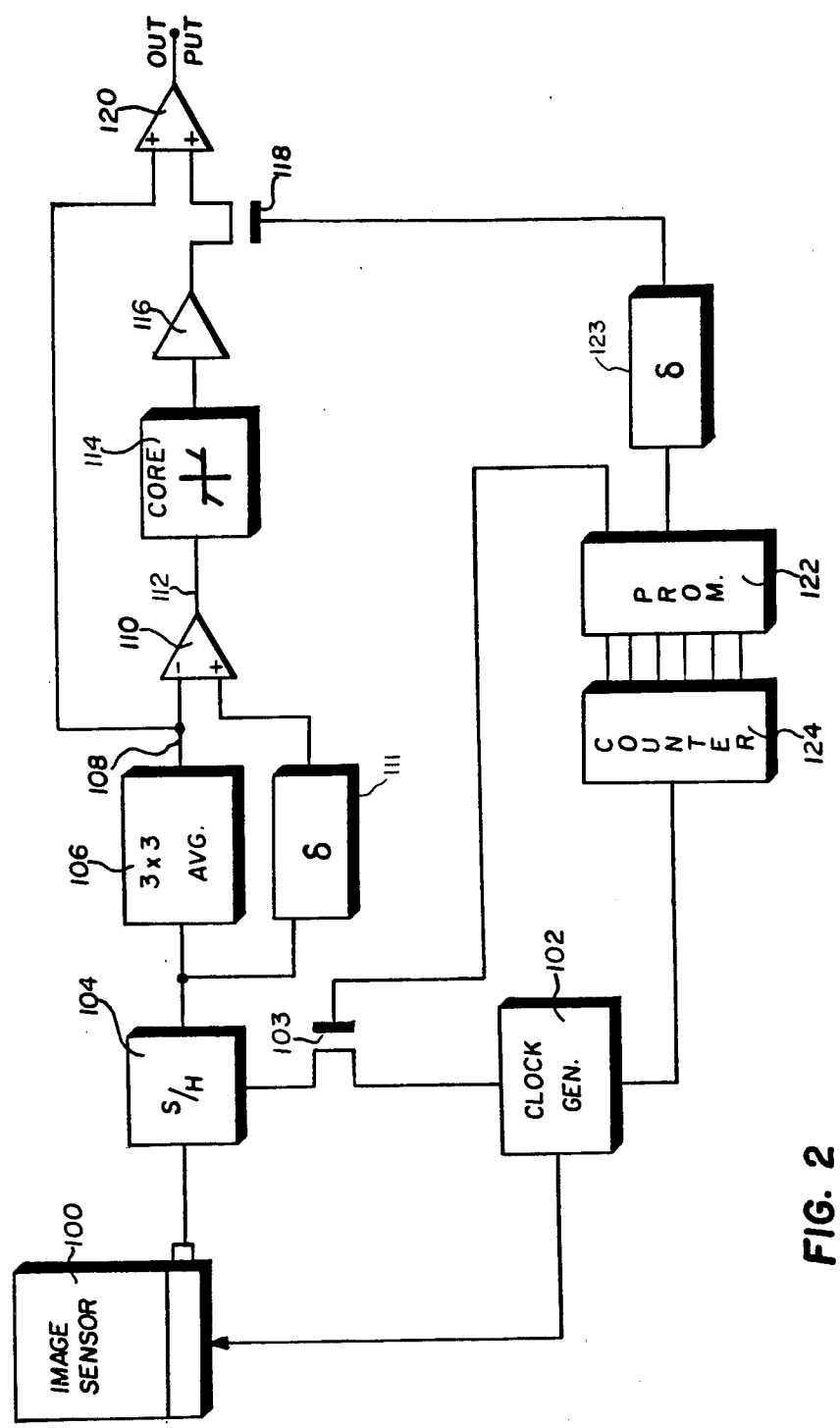
FIG. 2 is a schematic diagram of an alternative embodiment of a signal processing apparatus according to the present invention.

The present invention is easily extended to filters having longer delays, for crispening in both the horizontal and vertical direction. Also, the invention is easily extended to the use of alternative defect correction schemes, and further image enhancement processes. FIG. 2 shows a signal processing apparatus according to the present invention, particularly adapted to processing the output signals of an image sensor employed to scan a negative film image. The signal processing apparatus employs an alternative scheme for defect correction, and image enhancement.

Again, this example will be described with reference to the correction of column defects in the sensor, but it will be obvious to one of skill in the art, that the method and apparatus is easily extended to the correction of individual pixel defects.

An image sensor 100, for example of the frame transfer or interline-transfer type, receives clock signals from a clock generator 102. The output signal from the image sensor is sampled and held by sample-and-hold circuit 104, which likewise receives sample signals from the clock generator 102 through an FET switch 103. The sample-and-hold signal is supplied to an averaging filter 106 that averages the signal over a 3×3 pixel area. This averaging is accomplished in a well-known manner by providing a pair of one-line delays and a plurality of single pixel delays configured to simultaneously deliver the output signals representing a 3×3 pixel area. A weighted average of the signals is then taken to produce a "blurred" signal on line 108. The "blurred" signal is subtracted in a differential amplifier 110 from an appropriately delayed version of the output signal to produce a "detail" signal on line 112. The detail signal is cored in a conventional coring circuit 114 to remove the high-frequency low-amplitude information therefrom, thereby suppressing the appearance of film grain without totally eliminating fine picture detail. The cored detail signal is boosted in an amplifier 116, and supplied, through an FET switch 118 to one input of a summing amplifier 120. The blurred signal is supplied to another input of the summing amplifier. The output of summing amplifier 120 is the processed signal.

The gates of FET switches 103 and 118 are controlled by the outputs of a programable read-only memory 122. The control signal to FET switch 118 is shown delayed by a delay element 123 to compensate for the delay caused by averaging filter 106. It will be apparent to one skilled in the art that alternatively, the delay can be accounted for when programming memory 122, thereby obviating the need for delay element 123. The memory is addressed by a counter 124 that is clocked in synchronism with the output of the image sensor, as in the previously described example.

The operation of the signal processing circuit will now be described. Assuming, again, a defect in the 10th column of the image sensor, the first eight locations in the memory contain information to close both switches 103 and 118, thereby causing the processing circuit to produce an image-enhanced output signal. The 9th and 11th locations in the memory contain information for opening FET switch 118 while leaving FET switch 103 closed, thereby providing an unenhanced signal (the "blurred" signal) in the neighborhood of a defect. The 10th location in the memory contains information to open both FET switches 103 and 118, thereby providing a defect corrected, unenhanced signal.

The signal processing method and apparatus according to the present invention has been described with reference to a monochrome image sensor, however, it will be apparent to those skilled in the art that the method is readily extended to color image sensors, either by providing a full signal processing circuit for each color channel, or by providing the signal processing circuit for a luminance or green channel only. The invention has been described in detail with reference to particular embodiments thereof, however, it will be apparent to those skilled in the art that additions and modifications can be made within the spirit and scope of the following claims.

I claim:

1. Apparatus for processing the output signal from a solid state image sensor, having defects causing corresponding defects in the output signal thereof, comprising:
    (a) means responsive to the output signal for producing a defect corrected signal;
    (b) means responsive to the output signal for producing an image enhanced signal;
    (c) means responsive to the output signal for producing an unenhanced signal; and
    (d) control means for selecting said defect corrected signal at times corresponding to defect locations, for selecting said unenhanced signal at times corresponding to locations in the neighborhood of defects, and for selecting said image enhanced signal at other times.

2. The invention claimed in claim 1, wherein said means for producing a defect corrected signal comprises a finite impulse response filter for effecting interpolation between portions of the signal.

3. The invention claimed in claim 1, wherein said means for producing a defect corrected signal comprises means for replacing a defective signal portion with a previous undefective signal portion.

4. The invention claimed in claim 2, wherein said unenhanced signal comprises said output signal.

5. The invention claimed in claim 1, wherein said means for producing an image-enhanced signal comprises crispening filter means for producing a blurred signal representing a running average over a neighborhood of signal portions, means for subtracting the blurred signal from the output signal to produce a detail signal, and means for boosting the detail signal and adding it to the blurred signal to produce an image enhanced signal.

6. The invention claimed in claim 5, further comprising a coring filter responsive to the detail signal to remove high frequency low amplitude information therefrom to produce a cored detail signal, said cored detail signal being added back to said blurred signal to produce said image enhanced signal.

7. The invention claimed in claim 5, wherein said unenhanced signal comprises said blurred signal.

8. The invention claimed in claim 1, wherein said control means comprises a programmed memory containing information representing the signal processing required for each portion of the signal, means for addressing said memory in synchronism with the readout of the image sensor, and means responsive to the output of said memory for selecting the appropriate output signal for said signal processing apparatus.

9. A method of processing the output signal from a solid state image sensor having defective locations causing corresponding defects in the output signal hereof, comprising the steps of:
    correcting the portions of the signal having defects; and
    image enhancing only those portions of the signal outside the neighborhood of such corrected defects, leaving the signal unenhanced in the neighborhood of corrected defects.

10. The invention claimed in claim 9, wherein said correcting step comprises replacing a defective portion of the signal with a neighboring non-defective portion.

11. The invention claimed in claim 9, wherein said correcting step comprises replacing a defective portion of the signal with an interpolated average of neighboring non-defective portions.

12. The invention claimed in claim 9, wherein said image enhancing step comprises generating a blurred signal representing a running average over a neighborhood of portions of said signal, subtracting said running average from said signal to yield a detail signal, amplifying said detail signal, and adding said detail signal to said blurred signal to produce an image-enhanced signal.

13. The invention claimed in claim 12, wherein said enhancing step further comprises the step of coring said detail signal to remove high frequency, low amplitude information therefrom prior to adding said detail signal to said blurred signal.

14. The invention claimed in claim 12, wherein said unenhanced signal comprises said output signal.

15. The invention claimed in claim 12, wherein said unenhanced signal comprises said blurred signal.

* * * * *